Dec. 30, 1941.   D. FINLAYSON ET AL   2,267,791
PARACHUTE
Filed July 27, 1939
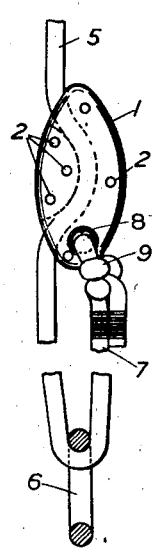
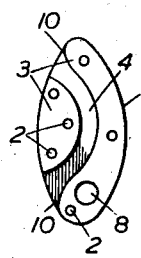
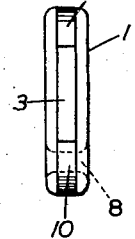
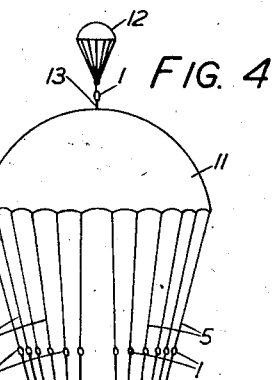
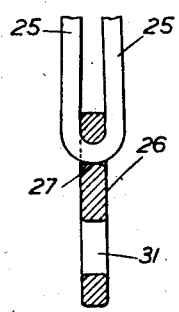
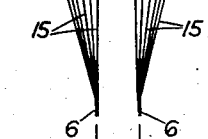
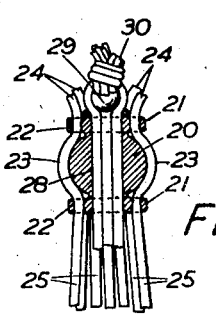
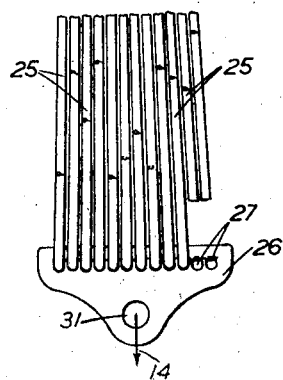
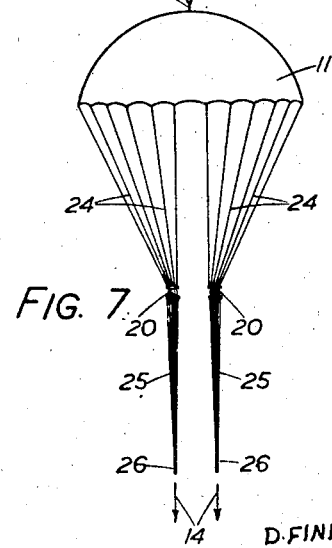
D. FINLAYSON
E. L. GREENWOOD
J. R. WYLDE
INVENTORS
ATTORNEYS Patented Dec. 30, 1941

2,267,791

UNITED STATES PATENT OFFICE 2,267,791

PARACHUTE

Donald Finlayson, Ernest Leslie Greenwood, and Joseph Rowland Wylde, Spondon, near Derby, England, assignors to Celanese Corporation of America, a corporation of Delaware Application July 27, 1939, Serial No. 286,862
In Great Britain August 15, 1938

8 Claims. (Cl. 244—142)

This invention relates to parachutes, and is particularly concerned with a cord or "shroud line" construction and assembly connecting the fabric of a parachute with the harness.

According to the invention a shroud line for a parachute comprises a cord that is looped so as to reduce its length and is adapted to extend to its full length when under load and in so extending to develop a frictional effort resisting extension and applied externally of the cord. On opening the fabric of the parachute, the cord does not run freely to its full length, but more slowly against the frictional effort, and the work expended in external friction absorbs at least part of the initial shock load applied between the fabric and the harness as the opening fabric checks the rate of descent, so that by the time the cord reaches its full extent it has merely to carry its proportion of the dead load represented by the falling body, or at any rate has only a little of the shock load to take up in addition to the dead load. Therefore, provided that the cords are made of materials having the necessary breaking strength to carry the dead load, the invention may be carried out with cords of materials having a low extensibility, since the taking up of shock load does not depend on the ability of the material to extend without breaking, as is the case when the load is applied directly to the cord.

Conveniently the invention is carried out by arranging that the external friction serving to take up the shock load gradually is generated at the surface of the cord itself, but preferably in such a way that no portion of the length of the cord is subjected more than momentarily to the friction. In this way no portion of the cord is subjected to danger of damage by the heat generated as a result of the friction. Thus, one end of the cord may be directly connected, say to the parachute fabric, and the other end of the cord is doubled back to form a loop, the doubled back end of which is attached to a member slidably engaged with the adjacent run of the cord. When load is applied by the opening of the fabric the loop begins to shorten by the member connected to the end of the cord in the loop running along the adjacent member of the cord. The member to which the end of the cord in the loop is attached provides so much resistance to running out of the cord that at or before the time the cord reaches its full extent the proportion of the shock load carried by the individual cord has been taken up by the work expended in friction between the sliding member which is being pulled downwardly by the load and the running part of the loop which is attached to the fabric, and thereby restrained from falling as fast as the load. Since the friction has been expended over the whole length of the loop that has run through the sliding member, no single portion of the cord has been exposed to damage by the heat generated.

In one form of loop arrangement, the load is applied to the sliding member from the loop itself, the loop being connected to the harness as by a ring or pulley. This harness connection is thus free to run on the length of the cord forming the loop.

One form of sliding member comprises a short tube or other form of body having a tubular passage therein through which one run of the cord loop is threaded, the passage being bowed so as to kink that run slightly and offer a substantial resistance to rapid running of the cord through the member. Preferably, however, the cord is able to slide fairly freely at a slow rate through the passage under a load corresponding to its proportion of the dead load represented by the falling body, which thus enables the cord to reach its full stretch after the absorption of the shock load. The ends of the passage are rounded or flared so as to present no sharp edges that might damage the cord.

The friction members may be made of wood, metal or other material capable of producing the required amount of friction when drawn over the material of the cord.

Where each of the cords (usually 24 in number) is provided with a separate friction member, the several members should be so shaped that they do not interfere with each other or with the cords or loops of cords as the assembly unfolds when it is withdrawn from the pack. The friction may, however, be provided by a single member or assembly of members to which a number of or even all the several cords are secured. In some cases such a common device may result in a reduction in weight as compared with a plurality of separate devices besides reducing the risk of entanglement of the cords.

By means of the invention, a parachute fitted with the cord assembly is able not only to take up the already high shock load of a body falling freely at about 175 feet per second when the opening of the fabric arrests the descent of the body to the slower rate of about 21 feet per second suitable for safe landing, but also can absorb the still higher loads arising in such cases as when the parachute opens while the horizontal component of motion is still high. Such cases arise for example when the rip cord is prematurely operated and when there is need for departure from an aeroplane capable of flying at speeds of 200 to 300 or more miles an hour, which speeds are in excess of the maximum speed of vertical descent of a freely falling body. For such contingencies it may also be desirable to fit the pilot parachute, which is employed to open first, and to pull out the main canopy of the parachute, with the shock absorbing means of the invention, such means being fitted either to the shroud lines of the pilot parachute, or to the main cord connecting the pilot parachute with the main canopy. In such cases, since the shock load is absorbed by friction, the cords have merely to be strong enough to take the dead load with a suitable factor of safety, and, as mentioned above, reliance has not to be placed on the ability of the material of the cord to extend sufficiently to absorb the shock load.

The material of which the cord is composed preferably consists of continuous filaments such as filaments of real silk and artificial filaments of cellulose acetate stretched and saponified, both these materials having a sufficiently high tenacity to enable relatively light cords to be used which are capable of packing into small compass. A braided construction may be used for the cords. Generally the cords comprise a core surrounded by a braid which may be a true braid of two sets of threads running helically in opposite directions, or may consist of generally longitudinal threads laced or woven with much lighter threads to form a sheet surrounding the core.

By way of example some forms of device according to the invention will now be described in greater detail with reference to the accompanying drawing, in which Fig. 1 is a side elevation of a device for attachment to a single cord to form a shroud line, Fig. 2 is a similar view of Fig. 1 partly broken away, Fig. 3 is a front elevation of the same device, Fig. 4 is a diagrammatic view of a parachute fitted with the device shown in Figs. 1-3, Fig. 5 is a side elevation in section of a device adapted to be attached to a number of cords, Fig. 6 shows a detail of Fig. 5, and Fig. 7 is a diagrammatic view similar to Fig. 4 of a parachute fitted with the device shown in Fig. 5.

Referring to Figs. 1-3, the device comprises a body 1 consisting (as shown in Fig. 3) of three layers secured together by means of rivets 2, the middle layer 3, which is exposed in Fig. 2, being formed with a curved channel 4 therein, through which part of the length of the cord 5 passes. The cord 5 passes down from the tubular passage formed by the channel 4 and the outer layers of the device, and through a ring 6 secured to the harness of the parachute, and then passes upwards to form a loop, the end 7 of the cord being passed through a hole 8 in the body 1 and secured as by means of a knot 9. The ends of the passage 4 indicated at 10 are rounded off to avoid abrasion of the cord.

As is shown in Fig. 4 the cords 5 are secured as shroud lines in the usual way to the lower edge of the canopy 11 of a parachute, the cords being in two groups of which each shares a ring 6 in common. The parachute is shown in Fig. 4 in the position immediately after the opening of the canopy, which is effected by means of a pilot parachute 12 secured to the main canopy 11 by means of a cord 13 provided with a device 1 of the kind shown in Figs. 1 and 2. At this stage of opening the cords 5 have not yet taken up the shock produced by the rapid motion of the load (indicated by means of arrows 14) and by the substantial resistance to motion of the open canopy 11. Consequently at this stage the lower parts 15 of the cords 5 are in the form of a double loop between the ring 6 and the device 1. When the cords become taut under the load 14 the devices 1 will slide downwards along the cords 5, reducing the size of the loop 15 and at the same time exerting a substantial frictional effort on the cords 5 by reason of the curvature of the passages 4. The motion of the devices 1 along the cords and the frictional effort against which such motion takes place absorbs the energy involved in the rapid motion of the load 14 and checks that motion. If, by the time the velocity of the load 14 has been reduced to the steady speed of fall of the parachute as a whole, the loops 15 are not so reduced as to bring the devices 1 down to the ring 6 the devices 1 will continue to slide slowly on the cords under the mere weight of the load 14.

In the device shown in Fig. 5 a number of cords are associated with a single device. This device comprises a bulbous body 20 having flanges 21, at the top and bottom, which flanges are each provided with twelve holes 22 through which the twelve cords associated with the device pass. The holes 22 are so disposed that in proceeding from one flange to the other the cord is deflected at 23 by the bulbous body 20 of the device, so that, as the cords slide through under tension, a frictional effort is developed. The upper ends 24 of the cords are single, and are connected to the canopy 11 of the parachute as indicated in Fig. 7. The lower ends 25 of the cords pass downwards to an attachment 26 having twelve holes 27 near the upper edge thereof, through which the cords 25 pass. From the connection 26 the cords, after passing through the holes 27, proceed upwards through a central hole 28 in the body 20 and are all secured together round a ball 29 by means of a knot 30 so that the ends cannot be pulled through the hole 28. A hole 31 in the connection 26 provides means for the attachment of the harness of the parachute whereby the load 14 is applied.

As is shown in Fig. 7, two devices of the form shown in Fig. 5 are employed with each parachute, the devices acting in a manner similar to that of the device shown in Figs. 1-4.

Having described our invention, what we desire to secure by Letters Patent is:

1. An assembly of shroud lines for a parachute comprising a plurality of cords, a device common to said cords and adapted frictionally to engage with part of the length of each of them, and to be secured to an end of each of them so as to form a loop in each cord, and at least one member through which the part of each cord forming the loop passes, said device being adapted, when said cords are under load applied at said member, to slide along the length of said cords so as to reduce the length of said loops and to exert upon said cords a frictional effort resisting said load.

2. An assembly of shroud lines for a parachute, comprising a plurality of cords a device engaged by a part of the length of each of said cords and having a bulbous body with means to constrain said cords to pass close to each end of an axis of said body so that they pursue a curved path in contact with said body, said body being adapted to be secured to the end of each of said cords so as to form a loop therein, and a member through which the part of each cord forming said loop passes, said device being adapted, when said cord is under load applied at said member, to slide along the length of said cords so as to reduce the length of said loops and to exert upon said cords a frictional effort resisting said load.

3. An assembly of shroud lines for a parachute, comprising a plurality of cords, a device engaged by a part of the length of each of said cords and having a bulbous body with two flanges each having holes therein through which said cords pass so that said cords pursue a curved path in contact with said body, said body being adapted to be secured to the end of each of said cords so as to form a loop therein, and a member through which the part of each cord forming said loop passes, said device being adapted, when said cords are under load applied at said member, to slide along the length of said cords so as to reduce the length of said loops and to exert upon said cords a frictional effort resisting said load.

4. A device for applying friction to a plurality of parachute shroud line cords, said device comprising a bulbous body, means to constrain the cords to pass close to each end of the axis of said body so that they pursue a curved path round and in contact with said body, and means for securing the end of each of said cords to said body.

5. A device for applying friction to a plurality of parachute shroud line cords, said device comprising a bulbous body, two flanges, one at each end of the axis of said bulbous body, each of said flanges having a hole for the passage of each of said cords so as to constrain said cords to pass close to each end of the axis of said body and to pursue a curved path round and in contact with said body, and means for securing the end of each of said cords to said body.

6. A parachute comprising a plurality of shroud lines each in the form of a cord having a loop at one end, a device for securing said end of each cord to a part of the length thereof so as to form said loop, and at least one member through which those parts of said cords forming said loops pass, said device being adapted, when said cord is under load applied at said member, to slide along the length of said cord so as to reduce the length of said loop, and to exert upon said cord a frictional effort resisting said load.

7. A parachute comprising at least one assembly of a plurality of shroud lines each in the form of a cord having a loop at one end, said assembly comprising a device common to said cords and adapted frictionally to engage with part of the length of each of them, and to be secured to an end of each of them so as to form a loop in each cord, and at least one member through which the part of each cord forming the loop passes, said device being adapted, when said cords are under load applied at said member, to slide along the length of said cords so as to reduce the length of said loops and to exert upon said cords a frictional effort resisting said load.

8. A parachute comprising at least one assembly of a plurality of shroud lines each in the form of a cord having a loop at one end, said assembly comprising a device in the form of a bulbous body with two flanges each having holes therein for the passage of said cords so as to constrain said cords to pursue a curved path in contact with said body, said body being adapted to be secured to the end of each of said cords so as to form the loop therein, and at least one member through which the part of each cord forming said loop passes, said device being adapted, when said cord is under load applied at said member, to slide along the length of said cords so as to reduce the length of said loops and to exert upon said cords a frictional effort resisting said load.

DONALD FINLAYSON.
ERNEST LESLIE GREENWOOD.
JOSEPH ROWLAND WYLDE.